United States Patent [19]
Goldstein

[11] 3,716,610
[45] Feb. 13, 1973

[54] METHOD OF MAKING IMPROVED NOSE CAPS FOR MISSILES AND ROCKETS

[75] Inventor: Max Goldstein, Columbus, Ohio

[73] Assignee: The United States of America as represented by the Secretary of the Army

[22] Filed: April 14, 1971

[21] Appl. No.: 133,921

[52] U.S. Cl. ............ 264/152, 264/108, 264/294, 156/195
[51] Int. Cl. ........ B29d 3/02, B32b 1/10, B32b 31/18
[58] Field of Search ....... 264/108, 162, 152; 156/195

[56] References Cited

UNITED STATES PATENTS

| | | | |
|---|---|---|---|
| 3,081,705 | 3/1963 | Warnken | 156/195 X |
| 3,328,501 | 6/1967 | Barnett | 264/108 |
| 3,367,817 | 2/1968 | Bluck | 156/195 |
| 3,402,085 | 9/1968 | Trimble | 156/195 X |
| 3,532,784 | 10/1970 | Vasterling | 264/152 |
| 3,655,863 | 4/1972 | Andersen et al. | 264/325 X |

Primary Examiner—Robert F. White
Assistant Examiner—Allen M. Sokal
Attorney—Charles K. Wright, William G. Gapcynski, Lawrence A. Neureither, Leonard Flank and Jack W. Voigt

[57] ABSTRACT

A method of making missile nose caps for extremely high temperature performance is disclosed. The method utilizes a typical material such as reinforcement fibers of silica or glass fiber tape inpregnated with a phenolic resin to form a panel. The panel which provides the proper orientation of the reinforcement fibers from a shingle angle to a perpendicular angle is shaped to a preform. The preform is placed in a mold and molded to a final shape and dimension required for the nose cap. If a rosette or rod tip is required, the tip is molded integrally with the nose cap.

5 Claims, 16 Drawing Figures

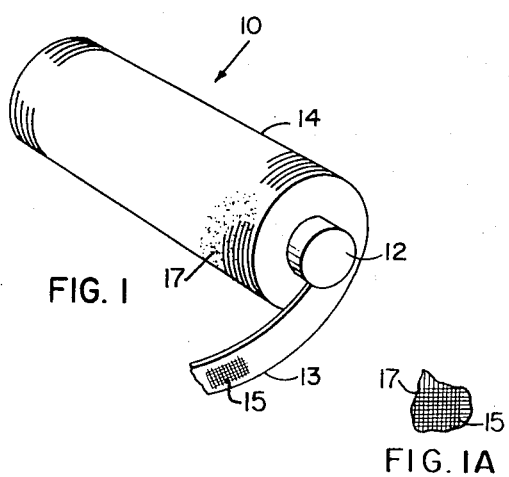
FIG. 1
FIG. 1A
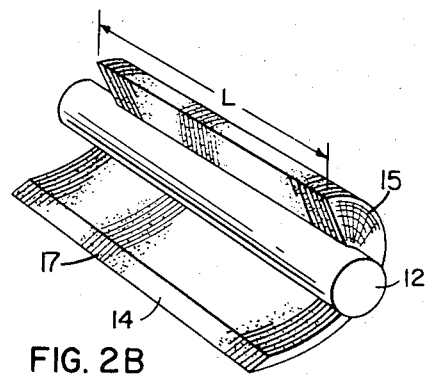
FIG. 2B
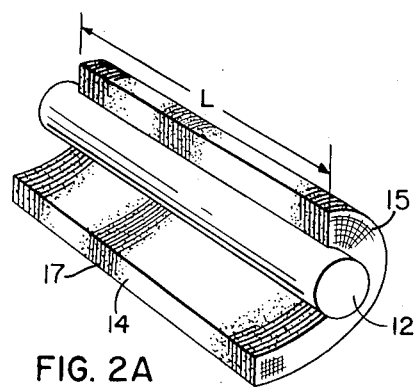
FIG. 2A
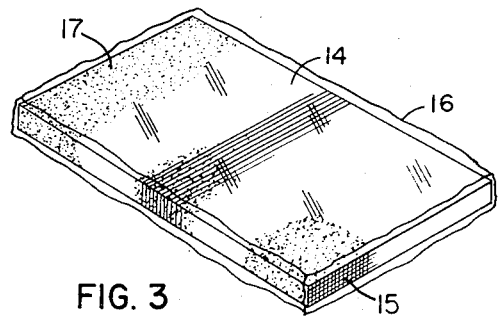
FIG. 3
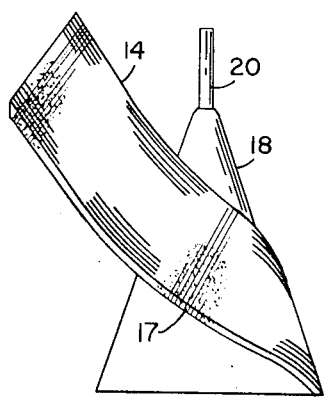
FIG. 4
Max Goldstein,
INVENTOR.
BY Jack W. Vogt 3,716,610

Max Goldstein,
INVENTOR.

BY Jack W. Vogt

Max Goldstein,
INVENTOR.
BY Jack W. Voigt 3,716,610

METHOD OF MAKING IMPROVED NOSE CAPS FOR MISSILES AND ROCKETS

BACKGROUND OF THE INVENTION

Ablative heat shielding is one of the most effective means for providing thermal protection to bodies exposed to extremely high temperatures and high heat fluxes such as are encountered in atmospheric re-entry of ballistic missile nose cones and space vehicles.

Various types of materials, which may be classified as glassy, subliming or intumescent, have been used for ablative cooling, and normally more than one of these types have been employed in combination with one another as a composite ablator. The most widely used composite has been comprised of silica fiber or glass fiber tape impregnated with phenolic resin.

A major problem has been related to flowoff, which term is applied to the loss of liquid mass. When the ablative material melts a glassy layer is formed which flows under the action of aerodynamic shear. When a surface indentation occurs by spalling of the char surface, a liquid glass flows into the hole and smooths the surface again. Therefore, it has been necessary to provide reinforcement fibers to anchor the molten glassy layer and char surface to the underlying unaffected material. To accomplish the anchoring effect for the highest degree of efficiency, it has been shown that the reinforcement fibers should be oriented at an angle from a shingle angle to a perpendicular angle to the surface of the nose cap or missile structure.

Present methods of achieving proper orientation of the reinforcement fiber involve:

a. Stacking circular discs of resin-impregnated cloth (comprised of silica or glass fibers) and molding into a cylindrical billet which is subsequently cured and then, machined to shape. This procedure provides perpendicular orientation of the reinforcement fibers; or b. Stacking cone shaped discs of resin-impregnated cloth into a billet and molding, followed by machining to shape. This procedure gives shingled orientation; or c. Tape wrapping an impregnated tape onto a conical mandrel and molding to shape. The tape can be wrapped on end to give a perpendicular orientation, or a shingle angle orientation.

The tip of the nose cap can be formed by rosetting or by a rod molded or bonded in place in the center of the nose cap. The rod can be wrapped from cloth, or can be formed of parallel filaments.

Desirable would be a method for forming a nose cap for a missile or rocket which method does not involve using a series of fiber discs to form a cylindrical billet which requires time consuming machining to shape.

Therefore, an object of this invention is to provide a method for forming a nose cap for a missile or rocket to obtain proper orientation of the reinforcement fibers without the need for stacking of fiber discs to form a cylindrical billet.

Another object of this invention is to provide a method for making a nose cap for a missile or rocket to enable substantially all machining to be accomplished prior to final molding of the nose cap (with or without a rosette or a rod tip) to its required geometrical shape.

A further object of this invention is to provide a method for making a nose cap for a missile or a rocket having increased strength due to helical formation of tape.

Still, a further object of this invention is to provide a method for making a nose cap for a missile or rocket which method results in a considerable savings in material and labor utilized.

SUMMARY OF THE INVENTION

The method of this invention comprises the formation of a panel by wrapping tape on a cylindrical mandrel, slitting, and removing the panel from the mandrel. The panel is constituted of a tape that is impregnated with a material selected from organic resins and ceramics or combinations thereof (e.g. phenolic resin, silica or glass fibers, or the like). The panel is uncured at this stage which permits the reshaping of the panel by heating below its cure temperature (e.g. curing temperatures and catalysts to promote curing are well established in the art) coupled with pressure to also densify if necessary. The panel may be shaped to a predetermined geometrical contour by the described procedure to follow. The panel is wrapped spirally around a suitable mandrel which defines the inside contour of the nose cap. At this stage of processing the material is known as a preform. The preform may be machined or cut to adjust the weight and dimension for proper molding. The preform is then placed in a mold (along with a rosette or rod tip if required) and molded to the final shape and dimensions required for the outside contour of the nose cap.

BRIEF DESCRIPTION OF THE DRAWINGS

Selected stages of the method of this invention are illustrated in the drawings as follows wherein:

FIG. 1 shows the formation of a panel on a mandrel;

FIG. 2 shows a panel being removed after slitting;

FIG. 3 shows a panel removed and in a flexible bag;

FIG. 4 shows a panel being wrapped spirally around a mandrel;

DESCRIPTION OF THE PREFERRED EMBODIMENTS

Figure 5:
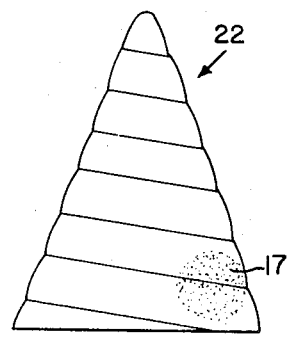
FIG. 5 shows a panel which is termed a "preform" for molding.

The missile or rocket nose cap of this invention provides the most pointed section of the missile or rocket which is subjected to the most extreme heat as the missile or rocket re-enters the atmosphere. The cap may be fabricated with or without a rosette or rod tip which makes up the outermost tip of the cap. A rosette is formed from a convolute wrap of layers of silica or glass fiber tape which is impregnated with phenolic resin. The convolute wrap is generally distorted into a conical shape for filling out the outermost tip of a missile or rocket nose cap. A rod tip may be made of a rod shaped member formed from wrapped impregnated tape or parallel filaments arranged in a rod shape. The rod tip is used in a similar fashion to the rosette tip to fill out the outermost portion of the nose cap. The excess of rosette tip or rod tip may be trimmed to the desired finish and contour.

References to the accompanying drawings are made wherein the first stage formation, 10 of FIG. 1, of a panel on a mandrel, begins by the selecting of a suitable mandrel 12 followed by the wrapping of silica fiber or glass fiber woven tape impregnated with a ceramic or an organic resin 13 to form a panel 14 on the mandrel. The number 15 of FIGS. 1, 1A, 2A, 2B, and 3 designates a typical tape weave of fibers which is shown as 15 (exclusive of the impregnation material, ceramic or resin) in FIG. 1A which is an enlarged view for clarity. The tape is oriented with its width either perpendicular to (edgewise) or at a conical angle to the mandrel centerline, depending on whether the nose cap is to have perpendicular or shingle angle orientation of the reinforcement. After the required length of winding (L) is attained (determined by the cone angle and desired helical wrapping angle required for a particular nose cap), the tape, wrapped edgewise at a perpendicular angle to the mandrel, is slit in a length-wise direction of the mandrel and the panel 14 is removed as shown in FIG. 2 A. FIG. 2 B shows the tape, with winding length (L), after being wrapped edgewise at a conical angle to the mandrel 12 and after being slit in a length-wise direction of the mandrel to remove the panel 14. The panel will have perpendicular angle oriented reinforcement fibers or shingle angle oriented reinforcement fibers depending upon whether the plane of the tape was perpendicular to (edgewise) or at a conical angle to the mandrel centerline respectively, during the previous wrapping operation. The preceding statement describes the results achieved from slitting a woven tape which has been wrapped as described. Further, it follows that slitting a woven tape which has been wrapped as noted will cause the fibers to be oriented in both a substantially vertical and horizontal arrangement in the panel 14. The substantially vertically arranged fibers of the panel will be either perpendicular or shingle angle oriented when further processed as described. Also, the substantially horizontally arranged fibers of the panel will have circumferential orientation when further processed as described. The panel is uncured at this stage of method. The uncured panel may be cut to the required geometrical shape, and the panel may be densified by subjecting it to heat below the cure temperature coupled with pressure. One means for applying pressure is by enclosing the panel in a sealed flexible bag (shown as 16 in FIG. 3) and exhausting the air from the bag, thus applying approximately 15 psi pressure to the panel 14.

The number 17 of FIGS. 1, 1A, 2A, 2B, 3, 4, 5, 6A, 7A, and 8 depicts typical reinforcement fiber ends.

FIG. 4 shows an uncured panel 14 being wrapped spirally around a mandrel 18 which defines the inside contour of the nose cap. A rod tip 20 is shown fitted to the mandrel. After the wrapping operation is performed the nose cap at this stage is termed a preform as illustrated by 22 of FIG. 5. The uncured preform may be easily machined at this stage, to adjust its weight and dimensions for proper molding. The preform is then placed in a suitable mold (not shown) and molded to final shape and dimensions required for the outside contour of the nose cap. If a rosette or rod tip is required, the tip can be molded integrally with the nose cap during the molding to final shape and dimensions.

Figure 6A:
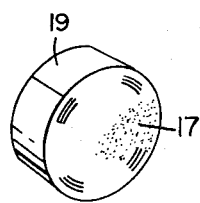
FIGS. 6 A, B, and C show a rosette tip in various stages of formation along with a cross section of a nose cap with a rosette tip moulded in place.
Figure 6B:
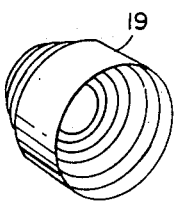
Figure 6C:
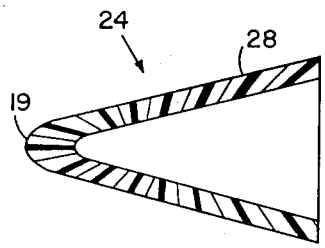

FIG. 6 A shows a rosette tip 19 in a convolute wrap. FIG. 6 B shows a rosette tip 19 in a convolute wrap distorted into a conical shape. FIG. 6 C shows a cross sectional view of a nose cap 24 with shingle angle orientation of the reinforcement fibers 28 and with a rosette 19 molded in place.

Figure 7A:
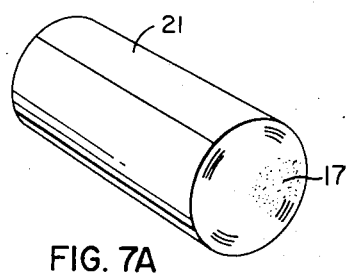
FIGS. 7 A, B, and C show rod tip types along with a cross section of a nose cap with a rod tip molded in place.
Figure 7B:
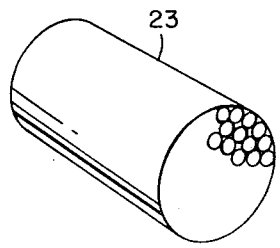
Figure 7C:
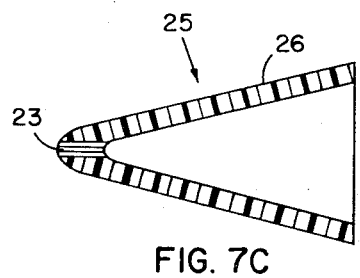

FIG. 7 A shows the type of rod tip generally referred to as cloth wrapped rod 21. FIG. 7 B shows the type of rod tip generally referred to as a parallel filiament rod 23. FIG. 7 C shows a cross sectional view of a nose cap 25 with perpendicular orientation of the reinforcement fibers 26 and with a rod tip 23 molded in place.

Figure 8:
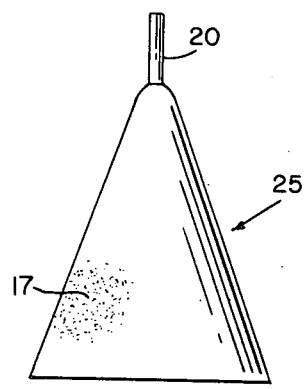
FIG. 8 shows a completed nose cap with a rod tip molded in place (prior to trimming the excess length of the rod)

FIG. 8 shows a substantially completed nose cap 25 with a rod tip 20 molded in place (prior to trimming the excess length of the rod).

Figure 9:
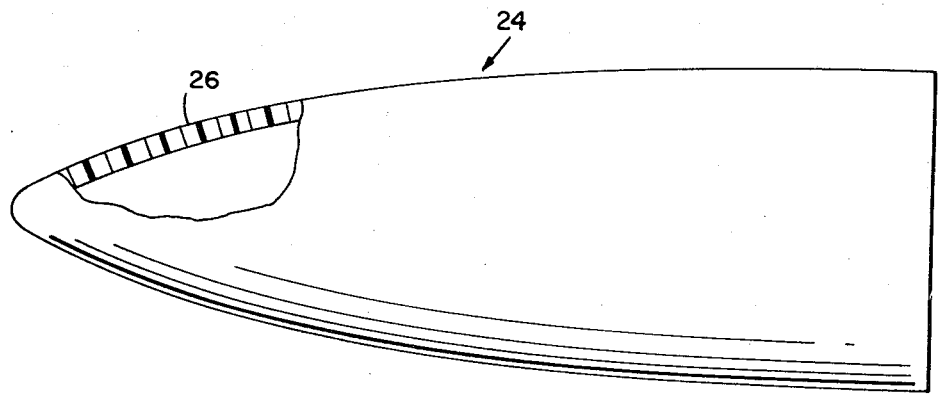
FIG. 9 shows a completed nose cap with a portion cut away to show perpendicular orientation of reinforcement fibers.

FIG. 9 shows a completed nose cap 24 having a portion cutaway and enlarged to show reinforcement fibers 26 which are oriented at a perpendicular angle.

Figure 10:
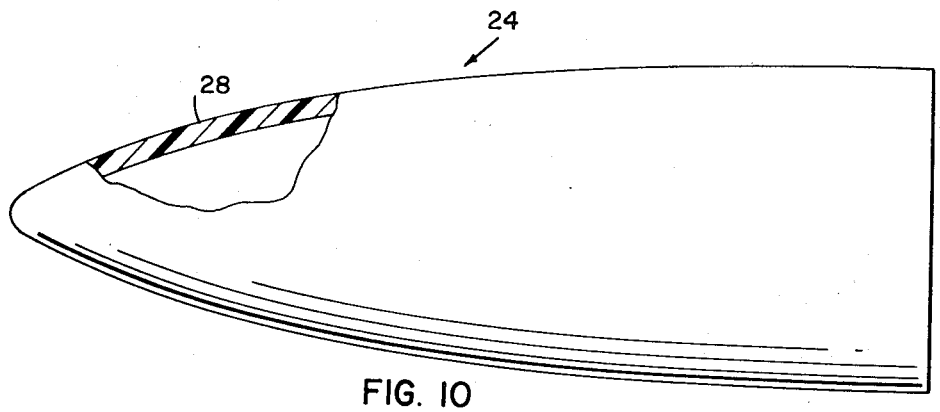
FIG. 10 shows a completed nose cap with a portion cut away to show shingle angle orientation of reinforcement fibers.

FIG. 10 shows a completed nose cap 24 having a portion cutaway and enlarged to show reinforcement fibers 28 which are oriented at a shingle angle.

The advantages of the method of this invention over the prior art method for making nose caps are:

1. Reduced cost due to speedy tape wrap as compared to stacking discs.
2. Greatly increased strength due to helical formation of tape. Helical formation of tape eliminates weak resin planes perpendicular to the axis of the nose cap.
3. Any necessary machining is done prior to final molding, when material is easily machined.

The method of this invention is suitable for all variations in tape weave and tape material, all variations in organic resins, as well as ceramic compositions used to impregnate tape, and for all variations in nose cap geometry, helix angle of wrap, etc.

I claim:

1. A method of making a nose cap for a missile or a rocket to achieve controlled orientation of reinforcement fibers of the impregnated tape used to construct said nose cap, said method comprising the steps of:
    a. forming a panel on a first mandrel, said panel being formed by wrapping said first mandrel with an impregnated tape that contains woven reinforcement fibers selected from silica fibers and glass fibers, said wrapping being accomplished by wrapping said tape with its width at a predetermined angle to the mandrel centerline;
    b. slitting and removing said panel from said first mandrel, said panel being constituted of an impregnated tape that is impregnated with a material selected from organic resins and ceramics or combinations thereof, and said tape being uncured when removed from said first mandrel;

c. reshaping said uncured panel by heating said uncured panel below its cure temperature coupled with pressure to shape to a predetermined geometrical contour;
d. wrapping said uncured panel spirally around a second mandrel to form a preform, said second mandrel defining the inside contour of nose cap for a missile or rocket;
e. performing any necessary machining or cutting operation on said preform to adjust weight and dimensions of said preform for proper molding;
f. placing said preform in a suitable mold and molding said preform to form a substantially finished nose cap for a missile or rocket, said suitable mold defining the outside contour of said nose cap, and said substantially completed nose cap being characterized by having reinforcement fibers oriented at a predetermined angle to the surface of said nose cap; and
g. machining and trimming said substantially completed nose cap to final shape and dimensions to complete said method of making a nose cap for a missile or rocket.

2. Method of claim 1 wherein said step of forming a panel is accomplished by wrapping said tape edgewise at a perpendicular angle to centerline of said first mandrel, said first mandrel being cylindrically shaped.

3. Method of claim 2 wherein prior to said step of placing preform in said suitable mold, a rosette or rod tip is properly positioned and molded integrally with the nose cap.

4. Method of claim 1 wherein said step of forming a panel is accomplished by wrapping said tape edgewise at a conical angle to centerline of said first mandrel, said first mandrel being cylindrically shaped.

5. Method of claim 4 wherein prior to step of placing preform in said suitable mold, a rosette or rod tip is properly positioned and molded integrally with the nose cap.

* * * * *